United States Patent [19]

Kummer et al.

[11] Patent Number: 5,315,193

[45] Date of Patent: May 24, 1994

[54] HAND-GUIDED MACHINE TOOL COMPRISING A RADIAL BLOWER

[75] Inventors: Martin Kummer, Filderstadt; Werner Rieker; Eckerhard Strötgen, both of Waldenbuch; Eberhard Prahst, Aichwald, all of Fed. Rep. of Germany

[73] Assignee: Robert Bosch GmbH, Stuttgart, Fed. Rep. of Germany

[21] Appl. No.: 910,305

[22] PCT Filed: Dec. 19, 1990

[86] PCT No.: PCT/DE90/00972

§ 371 Date: Jul. 15, 1992

§ 102(e) Date: Jul. 15, 1992

[87] PCT Pub. No.: WO91/11297

PCT Pub. Date: Aug. 8, 1991

[30] Foreign Application Priority Data

Feb. 2, 1990 [DE] Fed. Rep. of Germany ....... 4003029

[51] Int. Cl.⁵ .......................... H02K 7/14; H02K 9/06
[52] U.S. Cl. .......................................... 310/50; 310/58
[58] Field of Search ................... 310/47, 50, 58, 62, 310/63; 415/203, 204, 206, 207; 181/279, 280

[56] References Cited

U.S. PATENT DOCUMENTS

| 969,101 | 8/1910 | Gibson | 181/279 |
|---|---|---|---|
| 2,026,406 | 12/1935 | Watts | 415/207 |
| 2,596,646 | 5/1952 | Buchi | 415/207 |
| 2,777,079 | 8/1957 | Egglestone | 310/58 |
| 3,703,646 | 11/1972 | Jacyno | 310/47 |
| 3,799,703 | 3/1974 | Paine et al. | 417/312 |
| 3,829,721 | 8/1974 | Rosenthal, Jr. | 310/47 |
| 3,856,431 | 12/1974 | Tucker | 415/207 |
| 4,087,707 | 5/1978 | Shinoda et al. | 310/63 |
| 4,120,616 | 10/1978 | Dwyer et al. | 415/206 |
| 4,859,886 | 8/1989 | Tanaka et al. | 310/51 |
| 5,188,508 | 2/1993 | Scott et al. | 415/207 |

FOREIGN PATENT DOCUMENTS

| 74068 | 3/1983 | European Pat. Off. | |
|---|---|---|---|
| 1915713 | 10/1970 | Fed. Rep. of Germany | 310/50 |
| 3318199 | 11/1984 | Fed. Rep. of Germany | |
| 7404632 | 11/1985 | Fed. Rep. of Germany | |
| 3503172 | 7/1986 | Fed. Rep. of Germany | |
| 8601684 | 5/1987 | Fed. Rep. of Germany | |
| 337310 | 4/1904 | France | |
| 31490 | 3/1927 | France | |
| 716885 | 12/1931 | France | |
| 01770041 | 10/1982 | Japan | 310/58 |
| 0168833 | 6/1990 | Japan | 310/58 |
| 334717 | 9/1930 | United Kingdom | |
| 643796 | 9/1950 | United Kingdom | |
| 2057567 | 4/1981 | United Kingdom | 415/207 |

Primary Examiner—Steven L. Stephan
Assistant Examiner—C. LaBalle
Attorney, Agent, or Firm—Michael J. Striker

[57] ABSTRACT

A hand-guidable electric machine tool has a casing having an air guide duct, a tool part, a motor for driving the tool part, and a radial blower for cooling the motor, the radial blower having a fan wheel for forming a static pressure differential. The air guide duct has an inlet opening and an outlet opening and continuously widening in cross-section in a direction of the outlet opening. The cross-section measured in radial direction of the inlet opening of the air guide duct is smaller than the cross-section of the outlet opening.

17 Claims, 4 Drawing Sheets

HAND-GUIDED MACHINE TOOL COMPRISING A RADIAL BLOWER

BACKGROUND OF THE INVENTION

The present invention relates to a hand-guided electric machine tool with a radial blower.

More particularly, it relates to such a tool which has a motor for driving a tool, and a radial blower with a fan wheel forming a static pressure differential and having an air guide inside the casing.

Hand machine tools, such as drills, angle grinders or hand circular saws comprising radial blowers for cooling the motor, are already known. The air guide ducts in such machines, as for example in the percussion drill according to DE-OS 35 03 172, are disposed more or less in a circular ring around the fan wheel and serve solely to collect the air and discharge it in concentrated form. The air then passes out through cooling air slots provided in the casing. Not least because of the restricted space in hand machine tools, the ducts are not shaped to promote flow, and in particular, depending on the type of fan used, the sometimes very high dynamic pressure fraction is not exploited. In addition, because of the high speed of the outgoing air, this often becomes a nuisance to the operator.

SUMMARY OF THE INVENTION

Accordingly, it is an object of the present invention to provide a hand-guided electric machine tool of the above mentioned type, which avoids the disadvantages of the prior art.

In keeping with the above mentioned objects and with others which will become apparent hereinafter, one feature of the present invention resides, briefly stated, in a hand-guidable electric machine tool of the above mentioned type in which the air guide duct continuously widens in cross-section in the direction of its outlet opening, and the cross-section of the inlet opening of the air guide duct as measured in the radial direction is smaller than the cross-section of the outlet opening.

When the hand-guidable electric machine tool is designed in accordance with the present invention, it has in contrast the advantage that the air volume flow delivered by the radial blower is considerably increased and the noise produced is reduced. This is achieved through the fact that the fan wheel-generated dynamic pressure of the air flow delivered is converted in a widening air guide duct into static pressure, that is to say pressure delivering air. The improved air delivery of the radial blower according to the invention may be utilized either to reduce the size of the cooling cross-sections or that of the motor, or else to increase the power output of the motor. With a smaller increase in the amount of cooling air, the noise produced can be reduced to a greater extent.

In view of the restricted space in hand machine tools, it is particularly advantageous for the air guide duct to widen also, or exclusively, axially in the direction of flow, because the diameter of the motor casing is not thereby increased. The arrangement of a plurality of duct portions over the periphery of the fan wheel also permits adaptation of the air guidance, which increases the delivery volume, to restricted space conditions. It is moreover advantageous for the increase in volume flow already achieved to be further augmented by the provision of a diffuser-like mouth downstream of the air guide duct, thereby at the same time reducing the noise produced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
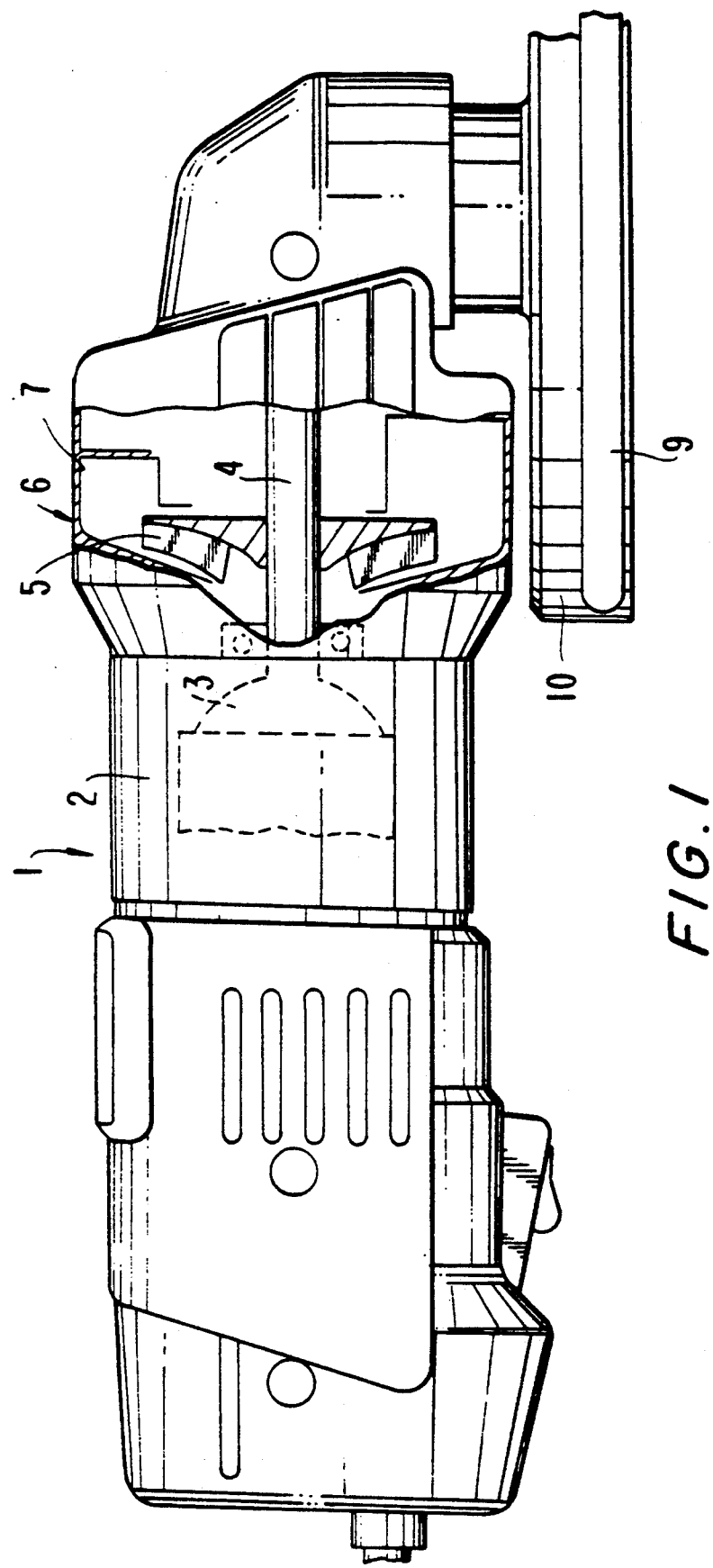
FIG. 1 shows a machine tool partly in section.

As an example of a hand-guided machine tool, an angle grinder 1 is shown which has a casing 2 in which an electric motor 3 is housed. Its shaft 4 also serves as a shaft for a fan wheel 5 of a radial blower 6. The latter is accommodated in an air guide casing 7 adjoining the casing of the motor 3. The rotary motion of the motor 3 is transmitted from the shaft 4 via an angle drive (not shown) to the tool, a grinding disc 9. The grinding disc 9 is partly covered by a protective hood 10.

Figure 2:
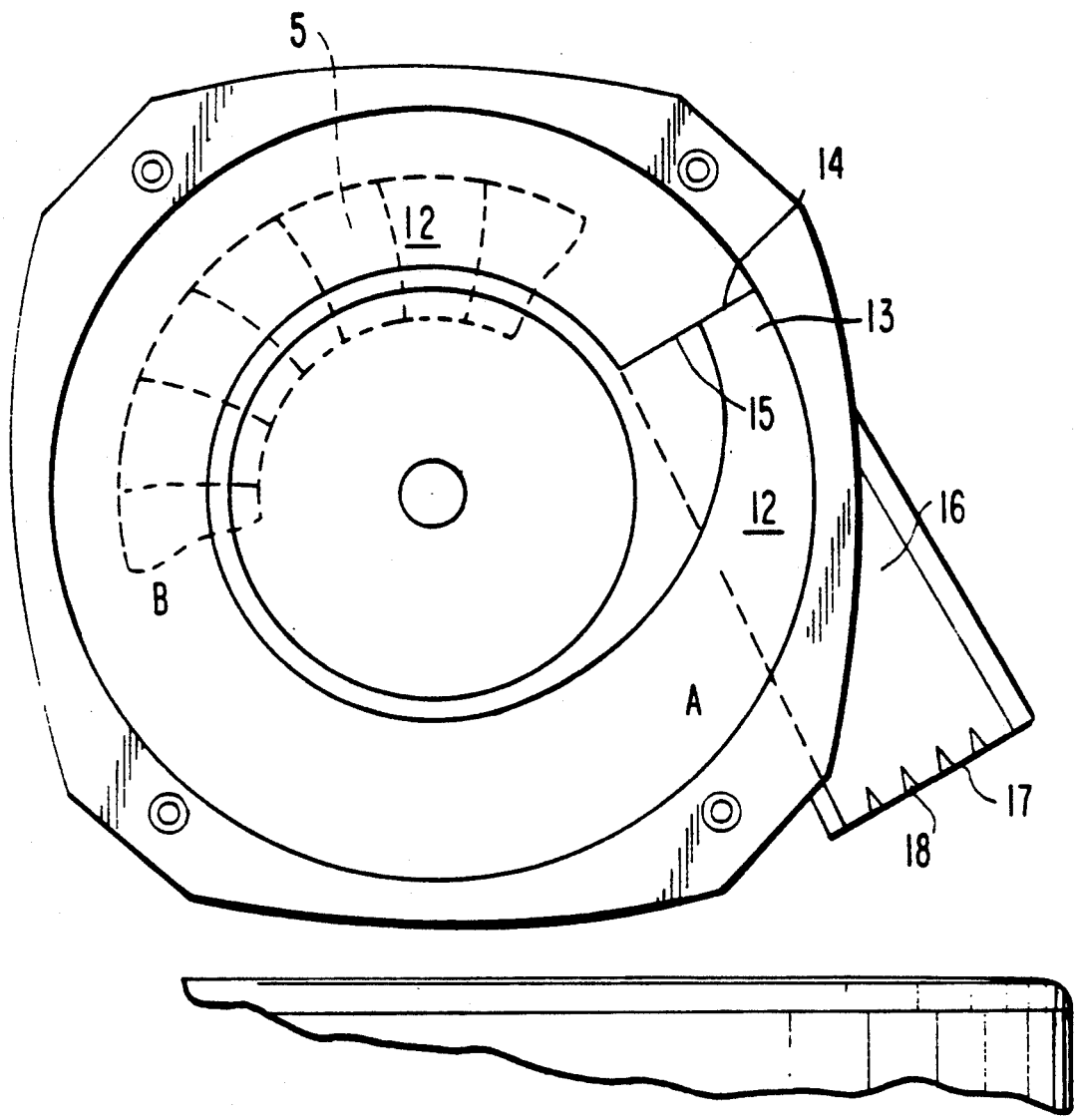
FIG. 2 shows a plan view of the air guide casing viewed from the fan wheel.
Figure 3:
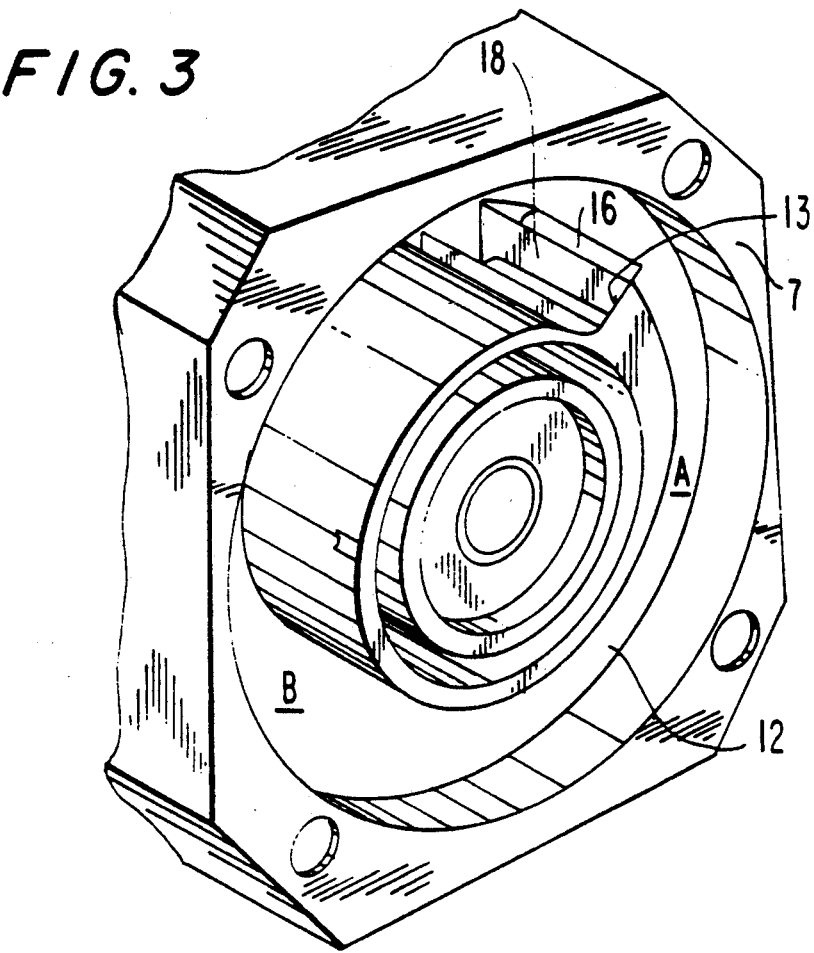
FIG. 3 shows a view in perspective of the air guide duct.

The air guide casing 7 contains a spirally wound air guide duct 12 which is partly disposed in a plane lying approximately at right angles to the shaft 4 of the fan wheel and which encloses an angle of 360° (see FIG. 2). Said duct is shaped helically in the direction of the axis of the shaft 4. It is formed in the air guide casing 7, its radially outer wall being in the form of the lateral surface of a cylinder. In the axial direction, the air guide duct 12 is bounded at the beginning by a tongue 13. The tongue is advantageously sharply pointed and which extends by its free edge in the radial direction relative to the axis of the fan-wheel shaft 4 (see also FIG. 3). The inlet opening 14 of the air guide duct 12 is situated on the tongue 13. Its cross-section measured in the radial direction is slight in both the axial and the radial direction.

In a first portion A extending over about 120 degrees, the air guide duct 12 widens spirally inwards in the radial direction. In addition, it widens in the axial direction away from the fan wheel. In the portion B following the first portion A the air guide duct 12 has a constant width in the radial direction, while in the axial direction it continues to widen uninterruptedly. At the end of the portion B an outlet opening 15 is provided. The opening measured in the radial direction, has a cross-section preferably greater by a factor of 6 to 10 than that of the inlet opening 14. Depending on the type of blower, the ratio of the cross-section of the inlet opening to that of the outlet opening is between 1:4 and 1:16. The outlet opening 15 is offset in the axial direction at a greater distance from the fan wheel 5 than the inlet opening 14, so that the beginning and the end of the air guide duct 12 can overlap axially. The outlet opening 15 is followed by a diffuser-like mouth 16. The mouth is formed by a length of duct directed approximately tangentially away from the helical air guide duct 12 and, viewed from the fan wheel 5, lies axially partly downstream of the portion A of the air guide duct 12. The mouth 16 also widens gradually and continuously as far as its end 17. For reasons of working safety, said end may be provided with narrow ribs 18 in order to prevent the insertion of a finger into the air guide duct 12, with the consequent risk of injury.

The radial blower 6 draws in cooling air through the motor 3, this air entering from the motor side centrally into the fan wheel 5. In the fan wheel 5, both the dynamic pressure and the static pressure of the air delivered are raised. The cooling action increases with the size of the air volume flow. The size of the air volume flow is determined by the static pressure differential of the radial blower 6. The invention is now based on converting the dynamic pressure fraction, which is produced by an increased speed of the medium delivered, by speed reduction into a static pressure, that is to say a pressure delivering air. This is done by means of the air guide duct 12, which widens continuously in the direction of flow and therefore has an increasing or at least constant cross-section, and which not only collects the air, as is done by previously used blowers, but also intentionally leads to a reduction in the speed of the delivered air. This is best achieved in a continuously widening duct. The action can be achieved both with a radial, spiral widening and with an axial, helical widening, as well as with a combination of the two measures. Depending on the space in the machine tool, the air guide duct may for example also be widened radially inwards.

Figure 4:
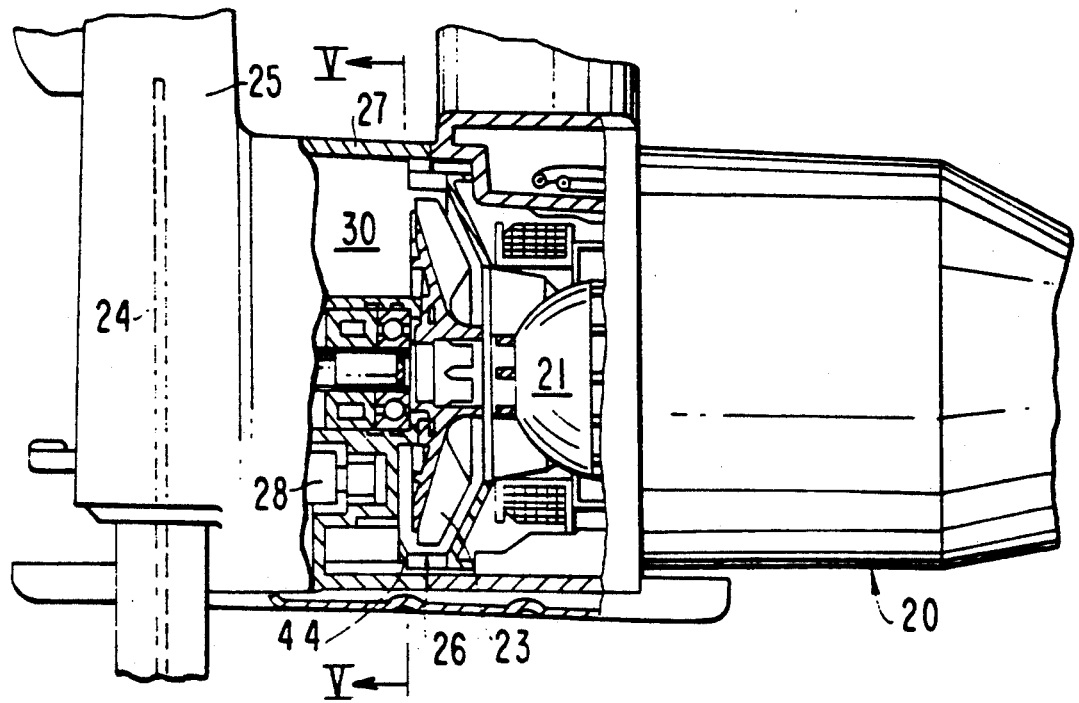
FIG. 4 shows a longitudinal section and FIG. 5 shows a section on the line V—V in FIG. 4 of a second exemplary embodiment.
Figure 5:
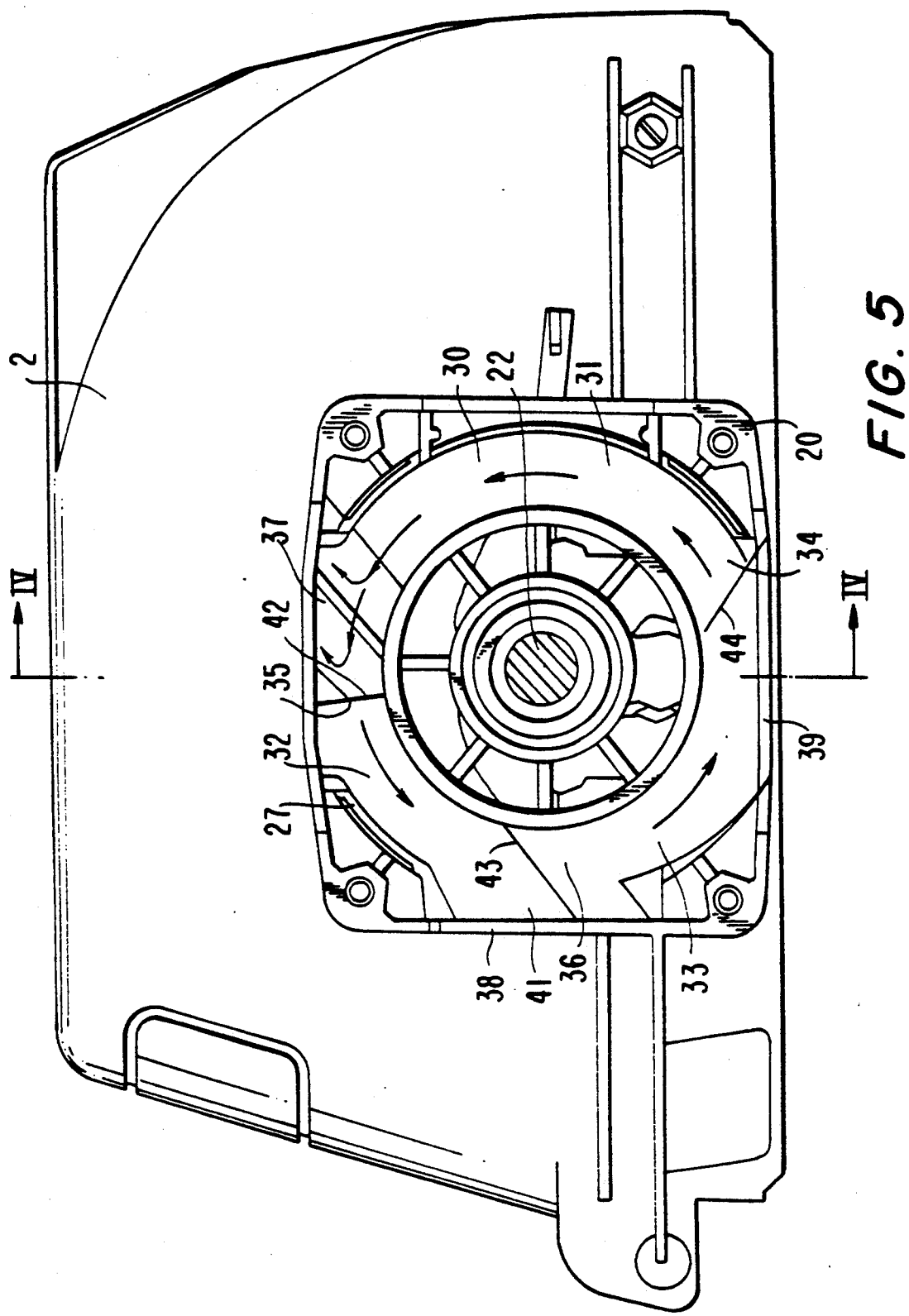

In the second exemplary embodiment, illustrated in FIGS. 4 and 5, a hand circular saw is shown. A motor 21, which has a fan wheel 23 mounted on the motor shaft 22 and also a saw blade 24, is housed in a casing 20. Here again, a radial blower 26 is formed by the fan wheel 23 and an air guide casing 27 which is integrated into the casing 20. The air guide casing 27 is limited in its spatial dimensions by a gear unit 28 between the motor shaft 22 and the shaft of the saw blade 24. An air guide duct 30 therefore cannot here be made in the form of a continuous helix continuously widening over 360°. Instead, three duct portions 31 to 33 adjoining one another are formed, of which each individual portion widens continuously from its respective inlet opening 34, 35 or 36 to its respective outlet opening 37, 38 or 39 of wider cross-section. The first duct portion 31 extends over an angular region of about 160° from its inlet opening 34 with axial widening as far as its outlet opening 37, and leads laterally into the protective casing 25. The second duct portion 32, which extends over about 90°, likewise widens axially and has a diffuser-like mouth 41. The third duct portion 33 widens spirally over about 110° and in the axial direction has a relatively slight constant depth. The air passes out tangentially through the outlet opening 39 in the air guide casing 27. The inlet openings 34, 35, 36 are each bounded by respective tongues 42, 43, 44, which partly lie obliquely in the radial direction.

The function of the radial blower 26 corresponds to that of the first exemplary embodiment, with the sole difference that the path on which the dynamic pressure is reduced is divided into a plurality of path parts. With a combination of duct portions of suitable length, which advantageously form together an angle of 360°, maximum throughput volume can be achieved. Given a suitable arrangement of the portions, which as far as possible widen radially and/or axially, and which may also overlap axially, any radial blower of a hand machine tool can be so designed as to achieve a maximum cooling action therewith.

The optimum cross-section ratio of inlet opening to outlet opening is reduced in comparison with the first exemplary embodiment according to the ratio of the overlap angle to the complete angle of 360°. With duct portions which for example extend over 90° the ratio is thus preferably from 1:1.5 to 1:2.5.

It will be understood that each of the elements described above, or two or more together, may also find a useful application in other types of constructions differing from the types described above.

While the invention has been illustrated and described as embodied in a hand-guided machine tool comprising a radial blower, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A hand-guidable electric machine tool, comprising a casing having an air guide duct; a tool part; a motor for driving said tool part; and a radial blower for cooing said motor, said radial blower having a fan wheel for forming a static pressure differential, said air guide duct being spirally wound and having an inlet opening and an outlet opening extending both in axial and radial direction and having a cross-section which continuously widens starting from said inlet opening all the way from said inlet opening to said outlet opening, and ending at said outlet opening, said outlet opening is offset in the axial direction at a greater distance from said fan wheel than said inlet opening, a cross-section measured in radial direction of said inlet opening of said air guide duct being smaller than a cross-section of said outlet opening.

2. A machine tool as defined in claim 1, wherein said fan wheel has a shaft, said air guide duct widening helically in a direction of said shaft of said fan wheel.

3. A machine tool as defined in claim 1, wherein said air guide duct widening spirally in a radial direction of said fan wheel.

4. A machine tool as defined in claim 1, wherein said fan wheel has a shaft, said air guide duct widening spirally inwards toward said shaft of said fan wheel in a radial direction of said fan wheel.

5. A machine tool as defined in claim 1, wherein a ratio of the cross-section of said inlet opening to the cross-section of said outlet opening measured in a radial direction is within the range from 1:4 to 1:16.

6. A machine tool as defined in claim 5, wherein said ratio is within the range from 1:6 to 1:10.

7. A machine tool as defined in claim 1, wherein said air guide duct has a plurality of continuously widening duct portions each having a portion inlet opening and a portion outlet opening and each extending over less than 360°.

8. A machine tool as defined in claim 7; and further comprising tongues which bound said portion inlet opening to said portions.

9. A machine tool as defined in claim 8, wherein said tongues extend obliquely in a radial direction.

10. A machine tool as defined in claim 7, wherein said duct portions together include an angle of about 360°.

11. A machine tool as defined in claim 1; and further comprising a diffuser-like mouth which adjoins said air guide duct.

12. A machine tool as defined in claim 7; and further comprising a diffuser-like mouth which surrounds one of said duct portions.

13. A machine tool as defined in claim 11, wherein said mouth is formed by a length of a duct directed tangentially away from it.

14. A machine tool as defined in claim 1, wherein said outlet opening of said air guide duct is offset in an axial direction in relation to said inlet opening.

15. A machine tool as defined in claim 11; and further comprising a tongue which bounds said inlet opening and has a rear side forming a boundary of said mouth.

16. A machine tool as defined in claim 15, wherein said duct forms a radial boundary of said mouth.

17. A machine tool as defined in claim 15, wherein said tongue forms an axial boundary of said mouth.

* * * * *